United States Patent
Ghose et al.

(10) Patent No.: US 10,214,240 B2
(45) Date of Patent: Feb. 26, 2019

(54) PARKING SCORING FOR AUTONOMOUS VEHICLES

(71) Applicant: GM GLOBAL TECHNOLOGY OPERATIONS LLC, Detroit, MI (US)

(72) Inventors: Shiva Ghose, Berkeley, CA (US); Kevin Chu, San Mateo, CA (US); Sohrab Haghighat, Emeryville, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 44 days.

(21) Appl. No.: 15/492,706

(22) Filed: Apr. 20, 2017

(65) Prior Publication Data
US 2018/0304926 A1 Oct. 25, 2018

(51) Int. Cl.
*B62D 15/02* (2006.01)
*G08G 1/14* (2006.01)

(52) U.S. Cl.
CPC ....... *B62D 15/0285* (2013.01); *B62D 15/027* (2013.01); *G08G 1/14* (2013.01); *G08G 1/142* (2013.01); *G08G 1/147* (2013.01)

(58) Field of Classification Search
CPC .... B62D 15/0285; B62D 15/027; G08G 1/14; G08G 1/142
See application file for complete search history.

(56) References Cited

U.S. PATENT DOCUMENTS

| | | | | |
|---|---|---|---|---|
| 2007/0075875 | A1* | 4/2007 | Danz | B60Q 9/006 340/932.2 |
| 2010/0271236 | A1* | 10/2010 | Moshchuk | B62D 15/0285 340/932.2 |
| 2016/0026878 | A1* | 1/2016 | Zhang | G06K 9/00798 348/148 |
| 2018/0164830 | A1* | 6/2018 | Moosaei | B60W 30/06 |
| 2018/0170365 | A1* | 6/2018 | Shani | B60W 30/06 |

* cited by examiner

*Primary Examiner* — Calvin Cheung
(74) *Attorney, Agent, or Firm* — Lorenz & Kopf, LLP

(57) ABSTRACT

In one embodiment, a method for selecting a parking location for an autonomous vehicle includes: obtaining data pertaining to a current ride of the autonomous vehicle during operation of the autonomous vehicle; determining, by a processor using the data, when the autonomous vehicle is proximate a destination; and, when the autonomous vehicle is proximate the destination: identifying, by the processor using the data, a plurality of potential parking locations proximate the destination; calculating, by the processor using the data, a respective score for each of the potential parking locations using a plurality of factors; and selecting, by the processor using the data, a selected parking location of the potential parking locations based on the respective score of each of the potential parking locations.

15 Claims, 7 Drawing Sheets

PARKING SCORING FOR AUTONOMOUS VEHICLES

TECHNICAL FIELD

The present disclosure generally relates to vehicles, and more particularly relates to systems and methods for selection of a parking location for an autonomous vehicle.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While autonomous vehicles offer many potential advantages over traditional vehicles, in certain circumstances it may be desirable for improved selection of parking locations for autonomous vehicles.

Accordingly, it is desirable to provide systems and methods for selecting parking locations for autonomous vehicles.

SUMMARY

Systems and methods are provided for selecting a parking location for an autonomous vehicle. In one embodiment, a method for selecting a parking location for an autonomous vehicle includes: obtaining data pertaining to a current ride of the autonomous vehicle during operation of the autonomous vehicle; determining, by a processor using the data, when the autonomous vehicle is proximate a destination; and, when the autonomous vehicle is proximate the destination: identifying, by the processor using the data, a plurality of potential parking locations proximate the destination; calculating, by the processor using the data, a respective score for each of the potential parking locations using a plurality of factors; and selecting, by the processor using the data, a selected parking location of the potential parking locations based on the respective score of each of the potential parking locations.

Also in one embodiment, the method further includes automatically parking the autonomous vehicle in the selected parking location, via instructions provided by the processor.

Also in one embodiment, the obtaining of the data includes obtaining data pertaining to respective distances between each of the potential parking locations and the destination; and the calculating includes calculating the respective score for each of the potential parking locations based at least in part on the respective distances.

Also in one embodiment, the obtaining of the data includes obtaining data pertaining to a width of a lane of a roadway in which the autonomous vehicle is travelling; and the calculating includes calculating the respective score for each of the potential parking locations based at least in part on the width of the lane.

Also in one embodiment, the obtaining of the data includes obtaining data pertaining to parking laws, regulations, or both, for a geographic region in which the autonomous vehicle is operating; and the calculating includes calculating the respective score for each of the potential parking locations based at least in part on the parking laws, regulations, or both.

Also in one embodiment, the obtaining of the data includes obtaining data pertaining to detected objects in proximity to the autonomous vehicle; and the calculating includes calculating the respective score for each of the potential parking locations based at least in part on the detected objects.

Also in one embodiment, the obtaining of the data includes obtaining data pertaining to respective traffic flows in proximity to each of the potential parking locations; and the calculating includes calculating the respective score for each of the potential parking locations based at least in part on the respective traffic flows.

Also in one embodiment, the obtaining of the data includes obtaining data pertaining to a respective ride comfort measure for each of the potential parking locations; and the calculating includes calculating the respective score for each of the potential parking locations based at least in part on the respective ride comfort measures In another embodiment, a system for controlling selection of a parking location for an autonomous vehicle includes a parking selection control module and a parking selection determination module. The parking selection control module is configured to at least facilitate obtaining data pertaining to a current ride of the autonomous vehicle during operation of the autonomous vehicle. The parking selection determination module include a processor, and is configured to at least facilitate: determining when the autonomous vehicle is proximate a destination; and, when the autonomous vehicle is proximate the destination: identifying, using the data, a plurality of potential parking locations proximate the destination; calculating, using the data, a respective score for each of the potential parking locations using a plurality of factors; and selecting, using the data, a selected parking location of the potential parking locations based on the respective score of each of the potential parking locations.

Also in one embodiment, the parking selection determination module is configured to at least facilitate automatically parking the autonomous vehicle in the selected parking location.

Also in one embodiment, the parking selection object module is configured to at least facilitate obtaining data pertaining to respective distances between each of the potential parking locations and the destination; and the parking selection determination module is configured to at least facilitate calculating the respective score for each of the potential parking locations based at least in part on the respective distances.

Also in one embodiment, the parking selection object module is configured to at least facilitate obtaining data pertaining to a width of a lane of a roadway in which the autonomous vehicle is travelling; and the parking selection determination module is configured to at least facilitate calculating the respective score for each of the potential parking locations based at least in part on the respective widths.

Also in one embodiment, the parking selection object module is configured to at least facilitate obtaining data pertaining to parking laws, regulations, or both, for a geographic region in which the autonomous vehicle is operating; and the parking selection determination module is configured to at least facilitate calculating the respective score for each of the potential parking locations based at least in part on the respective parking laws, regulations, or both Also in one embodiment, the parking selection object module is configured to at least facilitate obtaining data pertaining to detected objects in proximity to the autonomous vehicle; and the parking selection determination module is configured to at least facilitate calculating the respective score for each of the potential parking locations based at least in part on the detected objects.

Also in one embodiment, the parking selection object module is configured to at least facilitate obtaining data pertaining to respective traffic flows in proximity to each of the potential parking locations; and the parking selection determination module is configured to at least facilitate calculating the respective score for each of the potential parking locations based at least in part on the respective traffic flows.

Also in one embodiment, the parking selection object module is configured to at least facilitate obtaining data pertaining to a respective ride comfort measure for each of the potential parking locations; and the parking selection determination module is configured to at least facilitate calculating the respective score for each of the potential parking locations based at least in part on the respective ride comfort measures.

In another embodiment, an autonomous vehicle includes one or more sensors and a processor. The one or more sensors are configured to at least facilitate obtaining data pertaining to a current ride of the autonomous vehicle during operation of the autonomous vehicle. The processor is configured to at least facilitate: determining when the autonomous vehicle is proximate a destination; and when the autonomous vehicle is proximate the destination: identifying, using the data, a plurality of potential parking locations proximate the destination; calculating, using the data, a respective score for each of the potential parking locations using a plurality of factors; and selecting, using the data, a selected parking location of the potential parking locations based on the respective score of each of the potential parking locations.

Also in one embodiment, the processor is configured to provide instructions to at least facilitate automatically parking the autonomous vehicle in the selected parking location.

Also in one embodiment, the one or more sensors are configured to at least facilitate obtaining data pertaining to at least one of the following: respective distances between each of the potential parking locations and the destination; a width of a lane of a roadway in which the autonomous vehicle is travelling; parking laws, regulations, or both, for a geographic region in which the autonomous vehicle is operating; detected objects in proximity to the autonomous vehicle; respective traffic flows in proximity to each of the potential parking locations; or a respective ride comfort measure for each of the potential parking locations; and the processor is configured to at least facilitate calculating the respective score for each of the potential parking locations based at least in part on at least one of the following: the respective distances; the width of the lane; the parking laws, regulations, or both; the detected objects; the respective traffic flows; or the respective ride comfort measures.

Also in one embodiment, the one or more sensors are configured to at least facilitate obtaining data pertaining to each of the following: respective distances between each of the potential parking locations and the destination; a width of a lane of a roadway in which the autonomous vehicle is travelling; parking laws, regulations, or both, for a geographic region in which the autonomous vehicle is operating; detected objects in proximity to the autonomous vehicle; respective traffic flows in proximity to each of the potential parking locations; or a respective ride comfort measure for each of the potential parking locations; and the processor is configured to at least facilitate calculating the respective score for each of the potential parking locations based at least in part on at each of the following: the respective distances; the width of the lane; the parking laws, regulations, or both; the detected objects; the respective traffic flows; or the respective ride comfort measures.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
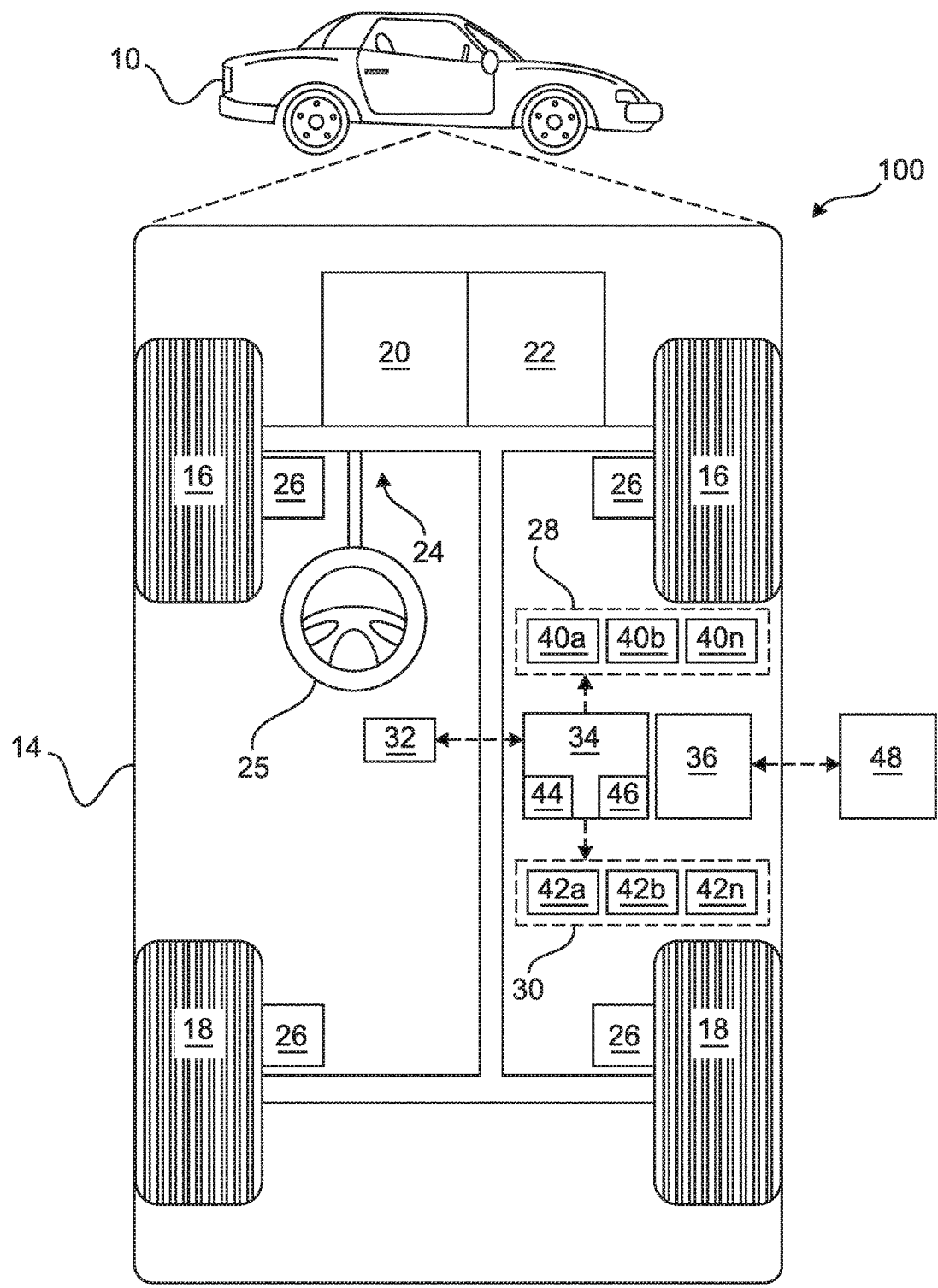
FIG. 1 is a functional block diagram illustrating an autonomous vehicle, in accordance with various embodiments.

With reference to FIG. 1, a parking location selection control system 100 shown generally as 100 is associated with a vehicle 10 in accordance with various embodiments. In general, the parking location selection control system (or simply "system") 100 controls selection of a parking location for the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the parking location selection control system 100, and/or components thereof, are incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, and the like, can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, systems in accordance with the present embodiment may be used in conjunction with any autonomous or other vehicle that utilizes a navigation system and/or other systems to provide route guidance and/or implementation.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. The actuator system 30 includes one or more actuator devices 42a-42n that control one or more vehicle features of the vehicle 10. In various embodiments, the actuator devices 42a-42n In addition, in various embodiments, the actuator devices 42a-42n (also referred to as the actuators 42) control one or more features such as, but not limited to, the propulsion system 20, the transmission system 22, the steering system 24, the brake system 26, and actuators for opening and closing the doors of the vehicle 10. In various embodiments, autonomous vehicle 10 may also include interior and/or exterior vehicle features not illustrated in FIG. 1, such as a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. Also in various embodiments, the data storage device 32 stores data pertaining to roadways on which the vehicle 10 is travelling (e.g., including lane width information) as well as other information (such as laws and regulations, including those relating to parking, in the geographic locations in which the vehicle 10 is operating). As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured for use in controlling parking, including selection of parking locations, for the vehicle 10.

Figure 2:
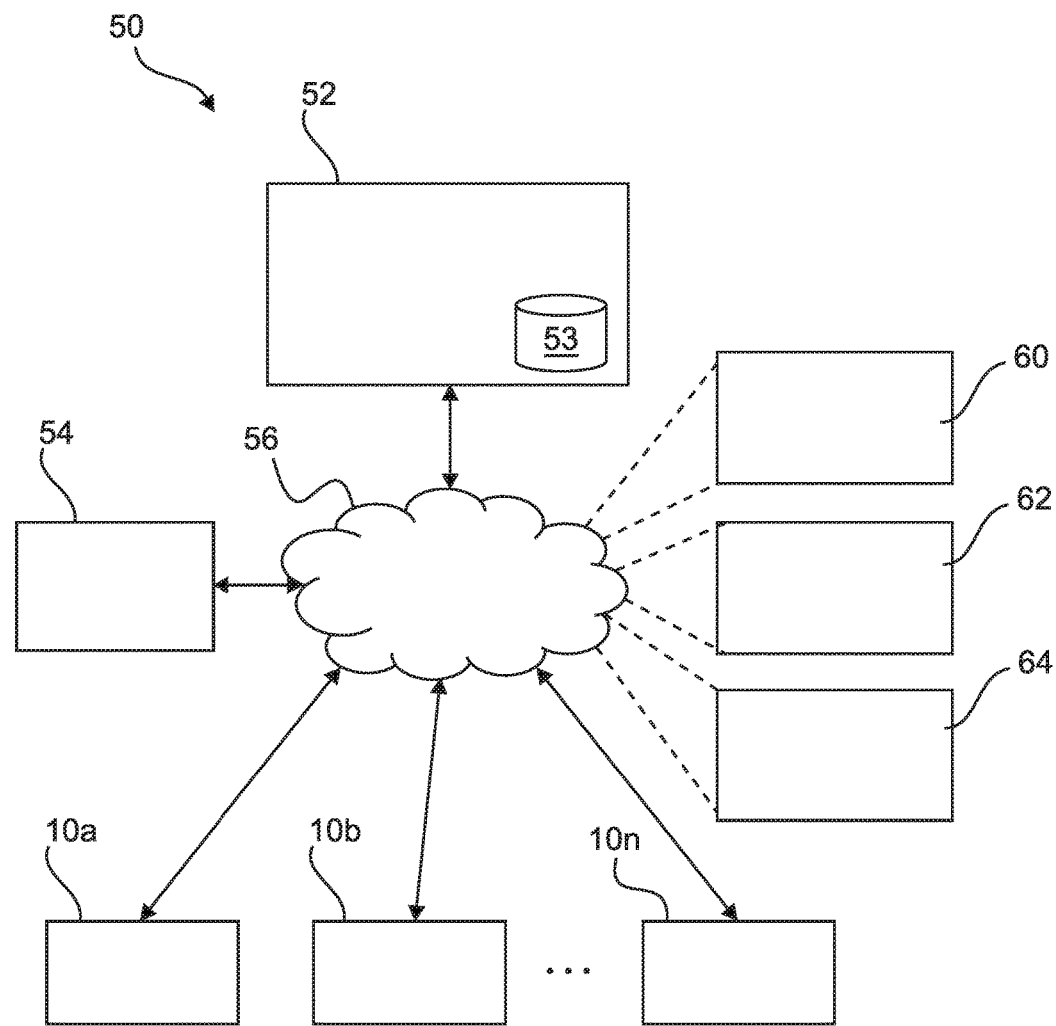
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, and the like) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. In one embodiment, as described in further detail below, remote transportation system 52 includes a route database 53 that stores information relating to navigational system routes, including lane markings for roadways along the various routes, and whether and to what extent particular route segments are impacted by construction zones or other possible hazards or impediments that have been detected by one or more of autonomous vehicles 10a-10n.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
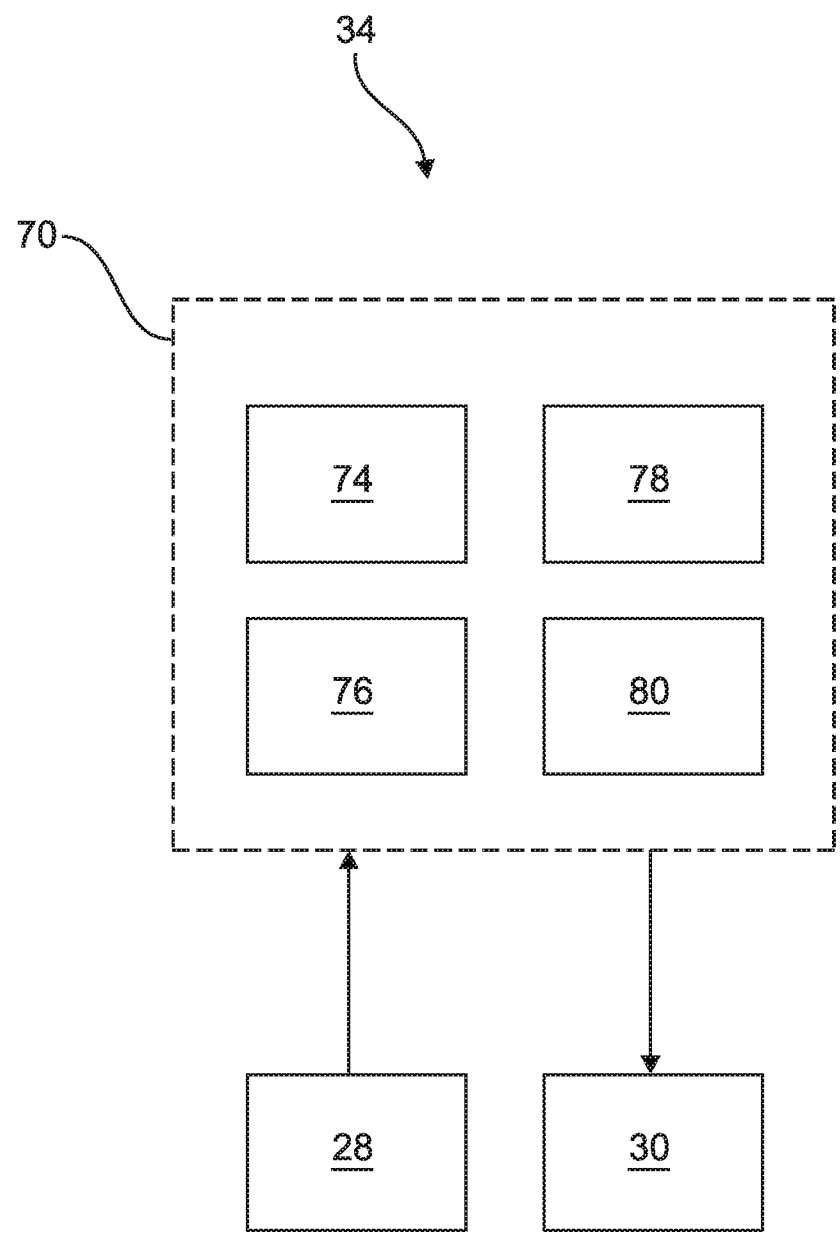
FIG. 3 is functional block diagram illustrating an autonomous driving system (ADS) associated with an autonomous vehicle, in accordance with various embodiments.

In accordance with various embodiments, controller 34 implements an autonomous driving system (ADS) as shown in FIG. 3. That is, suitable software and/or hardware components of controller 34 (e.g., processor 44 and computer-readable storage device 46) are utilized to provide an ADS that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

With reference back to FIG. 1, in various embodiments, one or more instructions of the controller 34 are embodied in the parking location selection control system 100 of FIG. 1, which controls selection of a parking location for the vehicle 10.

Figure 4:
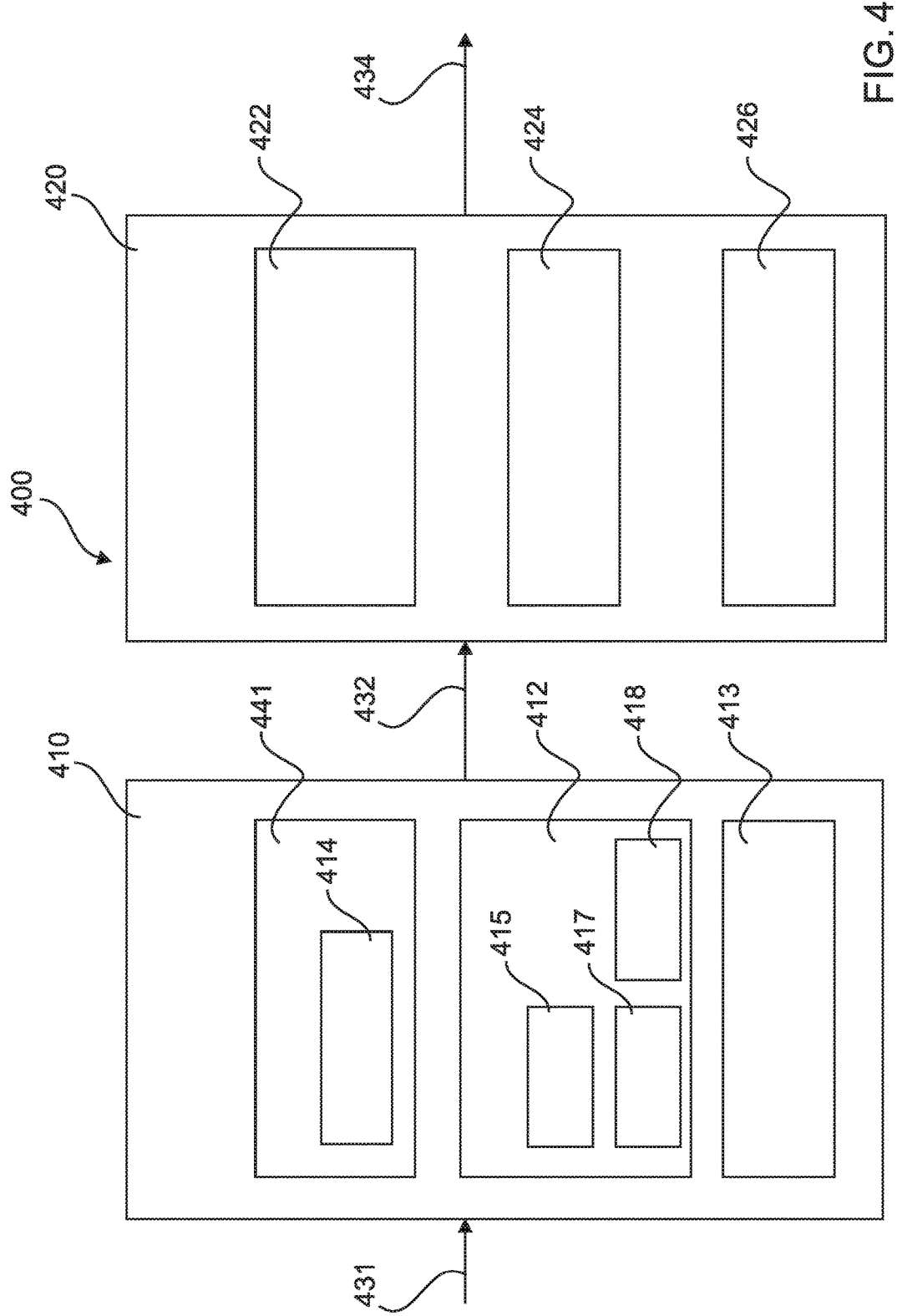
FIG. 4 is a dataflow diagram illustrating a parking location selection control system for autonomous vehicles, in accordance with various embodiments.

Referring to FIG. 4, an exemplary parking location selection control system 400 generally includes a parking location selection object module 410 and a parking location selection determination module 420. In various embodiments, the parking location selection object module 410 is disposed onboard the vehicle 10, for example as part of the sensor system 20 of FIG. 1. Also in the depicted embodiment, the parking location selection object module 410 includes an interface 411, sensors 412, and a transceiver 413.

In various embodiments, the interface 411 includes an input device 414. The input device 414 receives inputs from a user (e.g., an occupant) of the vehicle 10. In certain embodiments, the user inputs include inputs as to a desired destination for the current vehicle ride. Also in certain embodiments, the user inputs include a request, when appropriate, for parking the vehicle 10 in proximity to a desired destination. In certain embodiments, the input device 414 may include one or more touch screens, knobs, buttons, microphones, and/or other devices.

The sensors 412 provide sensor data pertaining to the vehicle 10, the current ride for the vehicle 10, the roadway and surroundings in proximity to the vehicle 10, and circumstances pertaining to various possible parking locations for the vehicle 10. In various embodiments, the sensors 412 include one or more cameras 415, lidar sensors 417, and/or other sensors 418 (e.g. transmission sensors, wheel speed sensors, accelerometers, and/or other types of sensors).

In addition, in various embodiments, the transceiver 413 communicates with the parking location selection determination module 420, for example via one or more wired and/or wireless connections, such as the communication network 56 of FIG. 2. Also in various embodiments, the transceiver 413 also communicates with one or more sources of information that are remote from the vehicle 10 (such as one or more global positioning system (GPS) satellites, remote services, and/or other remote data sources, for example as to local parking laws and regulations, traffic flows, and so on), for example via one or more wireless connections, such as the communication network 56 of FIG. 2. In addition, in certain embodiments, the transceiver 413 also receives inputs from the user (such as a requested destination and/or a request to park the vehicle 10), for example from the user device 54 of FIG. 2 (e.g., via one or more wired or wireless connections, such as the communication network 56 of FIG. 2).

In various embodiments, the parking location selection determination module 420 is also disposed onboard the vehicle 10, for example as part of the controller 34 of FIG. 1. Also in the depicted embodiment, the parking location selection determination module 420 includes a processor 422, a memory 424, and a transceiver 426.

In various embodiments, the processor 422 makes various determinations and provides control for selection parking locations for the vehicle 10. Also in various embodiments, the processor 422 of FIG. 4 corresponds to the processor 44 of FIG. 1.

In various embodiments, the memory 424 stores various types of information for use by the processor 422 in selection a parking location for the vehicle 10. For example, in certain embodiments, the memory 424 stores data pertaining to local parking laws and regulations, in addition to characteristics regarding nearby roadways and/or other types of information. Also in various embodiments, the memory 424 is part of the data storage device 32 of FIG. 1. In various embodiments, the transceiver 426 communicates with the parking location selection object module 410, for example via one or more wired and/or wireless connections, such as the communication network 56 of FIG. 2. Also in various embodiments, the transceiver 426 also facilitates the transmission of instructions from the processor 422 to the parking location object module 410, such as via the communication network 56 of FIG. 2.

With further reference to FIG. 4, in various embodiments inputs 431 are provided to the parking location selection object module 410. In various embodiments, the inputs 431 comprise instructions provided by one or more users (e.g., occupants) of the vehicle 10, for example as to a requested destination for the vehicle 10 and/or a request to park the vehicle 10. Also in various embodiments, the inputs 431 from the occupant are received via the input device 414 and/or the transceiver 413 (e.g., from user device 54 of FIG. 2). In addition, in various embodiments, the inputs 431 for the parking location selection object module 410 may further comprise data from one or more remote data sources (e.g., GPS satellites for location information and/or remote servers with information regarding local parking laws and regulations, among other possible data sources), for example as received via the transceiver 413.

Also with further reference to FIG. 4, in various embodiments the parking location selection object module 410 provides outputs 432 that serve as inputs for the parking location selection determination module 420. In various embodiments, the outputs 432 of the parking location selection object module 410 (or, the inputs for the parking location selection determination module 420) comprise information used by the parking location selection determination module 420 for use in selecting a parking location for the vehicle 10. For example, in various embodiments, the outputs 432 comprise sensor data obtained from the various sensors 412 (e.g. camera data, lidar data, and other data pertaining to the operation of the vehicle 10 and/or pertaining to possible parking locations for the vehicle 10), as well as information pertaining to the above-described user inputs and information from third party data sources (e.g., GPS satellites and/or remote servers and/or other data services with information regarding local parking laws and regulations and/or other data pertaining to the vehicle 10, its surroundings, and/or the possible parking locations). Also in certain embodiments, the outputs 432 are provided from the transceiver 413 of the parking location selection object module 410 to the parking location selection determination module 420 (e.g., via a wired or wireless connection).

Also as depicted in FIG. 4, in various embodiments the parking location selection determination module 420 provides outputs 434. In various embodiments, the outputs 434 of the parking selection determination module 420 comprise instructions from the processor 422 to one or more vehicle systems (e.g., the propulsion system 20, the transmission system 22, the steering system 24, the brake system 26, and/or the actuator systems 30 of FIG. 1) for effectuating the parking of the vehicle 10 in the selected parking location.

Figure 5:
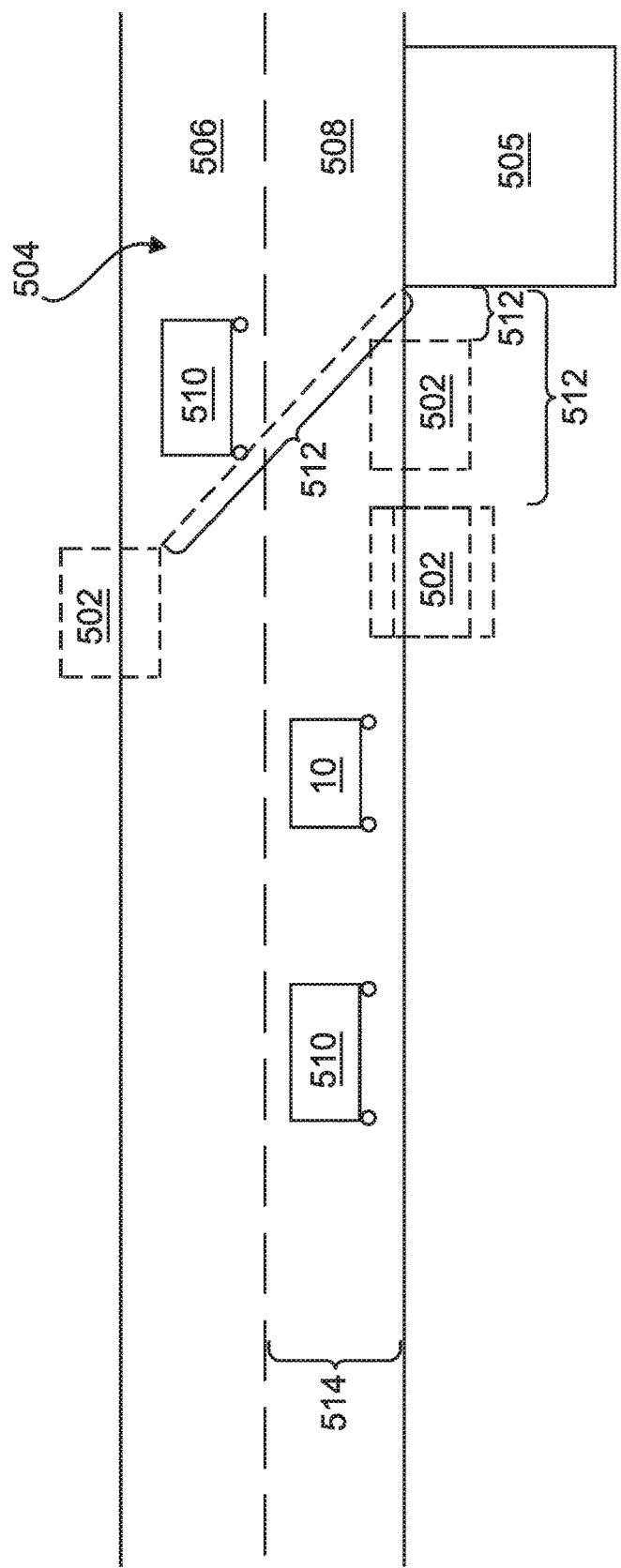
FIG. 5 is a schematic diagram of an autonomous vehicle on a roadway in proximity to a desired location, for which a parking location is to be selected, in accordance with various embodiments.

Turning now to FIG. 5, a schematic diagram is provided of the autonomous vehicle 10 in a particular environment, in accordance with various embodiments. As depicted in FIG. 5, in various embodiments the vehicle 10 is operating during a current vehicle ride along a roadway 504 en route to a destination 505. In the depicted example, the roadway includes two lanes 506, 508, with the vehicle 10 currently operating in current lane 508. Each lane 506, 508 has a respective lane width 514. Also as depicted in FIG. 5, various obstacles (e.g., other vehicle and/or other objects) 510 in proximity to the vehicle 10 are detected and monitored. Also as shown in FIG. 5, various possible parking locations 502 are identified and examined for the vehicle 10.

As will be set forth in greater detail below with respect to the control method 600 of FIG. 6, in various embodiments the possible parking locations 502 are analyzed with respect to a number of different factors, such as respective distances 512 between each parking location 502 and the destination 505, the detected objects 510 and their proximity to the respective parking locations 502, detected traffic flows with respect to each parking location 502, the lane widths 514 of the respective lanes 506, 508 (e.g., the lane(s) in proximity to the possible parking location), applicable local parking laws and regulations, and respective ride comfort measures with respect to the different possible parking locations 502.

Figure 6:
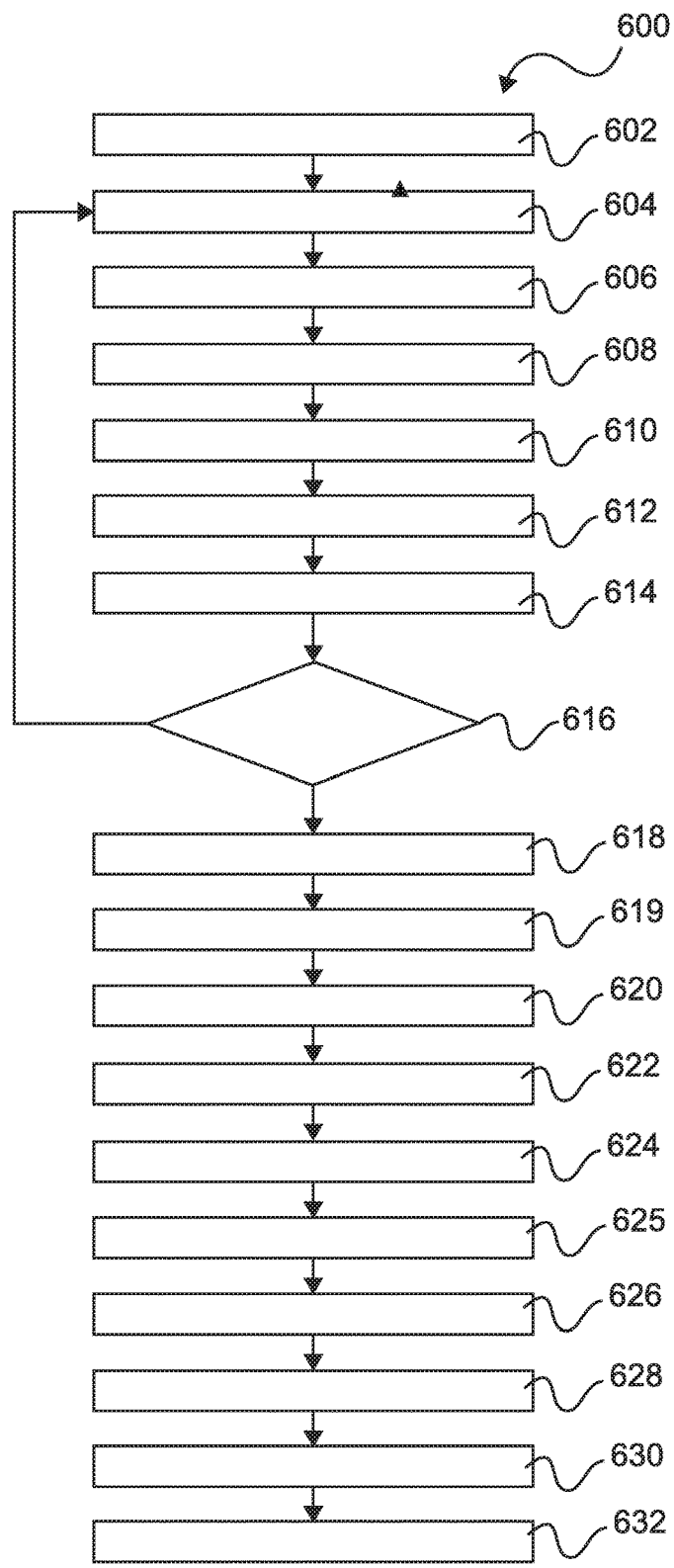
FIG. 6 is a flowchart for a control process for selecting a parking location for an autonomous vehicle, in accordance with various embodiments.

Referring now to FIG. 6, a flowchart is provided for a control method 600 for selecting a parking location for an autonomous vehicle, in accordance with various embodiments. The control method 600 is discussed below in connection with FIG. 6 as well as continued reference to FIGS. 1-5. In various embodiments, the control method 600 can be performed by the system 100 and the associated implementations of FIGS. 1-5, in accordance with exemplary embodiments. As can be appreciated in light of the disclosure, the order of operation within the method is not limited to the sequential execution as illustrated in FIG. 6, but may be performed in one or more varying orders as applicable and in accordance with the present disclosure. In various embodiments, the control method 600 can be scheduled to run based on one or more predetermined events, and/or can run continuously during operation of the autonomous vehicle 10.

In various embodiments, the control method 600 may begin at 602. In various embodiments, 602 occurs when an occupant is within the vehicle 10 and the vehicle 10 begins operation in an automated manner.

Passenger inputs are obtained at 604. In various embodiments, the passenger inputs pertain to a desired destination for travel via the vehicle 10. In various embodiments, the user inputs may be obtained via the input device 414 of FIG. 4 and/or the user device 54 of FIG. 2 (e.g., via the transceiver 413 of FIG. 4). In various embodiments, the passenger inputs are obtained via a passenger or other user of the vehicle 10 (e.g., an owner of the vehicle 10, a user of a ride-sharing service using the vehicle 10, and so on).

Map data is obtained at 606. In various embodiments, map data is retrieved from a memory, such as the memory 424 of FIG. 4 (e.g., corresponding to the data storage device 32 of FIG. 1, onboard the vehicle 10). In certain embodiments, the map data may be retrieved from the route database 53 of the autonomous vehicle based remote transportation system 52 of FIG. 2. Also in various embodiments, the map data comprises maps and associated data pertaining to roadways that are near the vehicle 10 and/or that are near or on the way from the vehicle 10's current to its destination (e.g., per the passenger inputs).

Also in various embodiments, sensor data is obtained at 608. In various embodiments, data is obtained from the various sensors 412 of FIG. 4. For example, in various embodiments, camera data is obtained from the cameras 415 of FIG. 4 (e.g., of roadway and surroundings pertaining to the vehicle 10), objects (e.g., objects 510 of FIG. 5) in proximity to the vehicle 10 are detected and monitored using the lidar sensors 417 of FIG. 4, and various other data is obtained via the other sensors 418 of FIG. 4 (e.g., further detection and tracking of objects using sonar, radar, and/or other sensors, obtaining measurements pertaining to the vehicle's speed and acceleration via wheel speeds sensors and accelerometers, and so on).

In various embodiments, other data is obtained at 610. In various embodiments, the other data is obtained at 610 via the transceiver 413 from or utilizing one or more remote data sources. By way of example, in certain embodiments, the other data of 610 may include GPS data using one or more GPS satellites, including the present location of the vehicle 10; data regarding applicable traffic, parking, and/or other laws and regulations for geographic regions in which the vehicle 10 is travelling; and/or weather, construction, traffic, and/or other data from one or more remote sources that may have an impact on parking location, route selection, and/or other operation of the vehicle 10, and/or one or more various other types of data. In addition, in various embodiments, additional data is also obtained that includes map data (e.g., of roadways and/or geographic regions and/or locations in which the vehicle 10 is travelling), along with data pertaining to traffic and/or tracked objects such as pedestrians, bicycles, cyclists, construction, debris, and the like. Also in certain embodiments, data pertaining to a selected route is obtained and utilized in connection with this data (e.g., the map data and data pertaining to traffic and/or tracked objects such as pedestrians, bicycles, cyclists, construction, debris, and the like).

A path for the autonomous vehicle is planned and implemented at 612. In various embodiments, the path is generated and implemented via the ADS 70 of FIG. 3 for the vehicle 10 of FIG. 1 to reach a requested destination (e.g., corresponding to the destination 505 of FIG. 5), using the passenger inputs of 604 and the map data of 606, for example via automated instructions provided by the processor 422. In various embodiments, the path of 612 comprises a path of movement of the vehicle 10 that would be expected to facilitate movement of the vehicle 10 to the intended destination while maximizing an associated score and/or desired criteria (e g, minimizing driving time, maximizing safety and comfort, and so on). It will be appreciated that in various embodiments the path may also incorporate other data, for example such as the sensor data of 608 and/or the other data of 610. In various embodiments, the path for the vehicle 10 is planned and implemented using the processor 422 of FIG. 4.

A current location of the vehicle is determined at 614. In various embodiments, the current location is determined by the processor 422 using information obtained from 604, 606, 608 and/or 610. For example, in certain embodiments, the current location is determined using a GPS and/or other location system, and/or is received from such system. In certain other embodiments, the location may be determined using other sensor data from the vehicle (e.g. via user inputs provided via the input device 414 and/or received via the transceiver 413, camera data and/or sensor information combined with the map data, and so on).

A determination is made at 616 as to whether the vehicle 10 is currently in proximity to the desired destination. In various embodiments, the processor 422 of FIG. 4 determines whether the vehicle 10 is within a predetermined distance or time from the intended destination 505 of FIG. 5 (e.g., the destination for the path planning of 612, based on the destination from the passenger inputs of 604), such that parking of the vehicle 10 would be appropriate. In certain embodiments, the predetermined distance is equal to fifteen meters; however, this may vary in other embodiments. In various embodiments, the determination of 616 is determined by the processor 422 of FIG. 4.

If it is determined in 616 that the vehicle 10 is not currently in proximity to the destination, then the process proceeds to 604. The process continues, beginning with a new iteration of 604. 604-616 thereafter repeat until a determination is made in an iteration of 616 that the vehicle 10 is proximate the destination.

Once it is determined in 616 that the vehicle 10 is proximate the destination, an identification is made at 618 as to possible parking locations. In various embodiments, the processor 422 of FIG. 4 identifies possible parking locations based on the current location of the vehicle 10 (e.g., from 614) as well as from map data (e.g., from 606) and sensor data (for example, camera data and lidar data from 608). For example, possible parking locations may be designated as such on a map or other stored data, and/or may be identified using the sensor data (e.g., if there is an open location in proximity to the destination 505 in which the vehicle 10 can park). In certain embodiments, the possible parking locations pertain to curbside pick-ups and/or drop-off locations for a passenger to exit from and enter the vehicle 10. In addition, in various embodiments, the process 600 does not rely on structure in the environment (such as free designated parking spots) in order to ascertain where the vehicle 10 can pull over. Accordingly, in various embodiments, possible parking locations are identified for pulling over and temporarily parking in an unstructured urban environment.

Distances are determined at 619 for the possible parking locations. In various embodiments, the processor 422 of FIG. 4 calculates a respective distance between each of the possible parking locations of 618 and the destination 505 (e.g., respective distances 512 from FIG. 5). In certain embodiments, each distance of 619 comprises a walking distance between the respective possible parking location and the destination 505. In addition, in certain embodiments, hazard lights for the vehicle 10 are turned on as the vehicle 10 approximates the destination, for example to advise other active traffic participants that that vehicle 10 will be stopping soon.

A lane width is determined at 620. In various embodiments, the processor 422 of FIG. 4 determines a lane width of a lane in which the vehicle 10 is currently travelling (e.g., the lane width 514 of lane 508 of FIG. 5), and/or for a lane that is in close proximity to a particular possible parking location for the vehicle 10. In certain embodiments, the lane width may be designated as such on a map or other stored data, and/or may be identified using the sensor data (e.g., camera and/or lidar data).

Local laws and regulations are analyzed at 622. In various embodiments, information pertaining to local parking laws and regulations are analyzed with respect to a geographic region (e.g., country, state, city, and so on) for which the vehicle 10 is currently operating. In certain embodiments, the laws and regulations are obtained at 610 (e.g. from memory and/or from one or more remote data sources), for example via the memory 424 and/or transceivers 413 and/or 426 of FIG. 4, and are analyzed by the processor 422 of FIG. 4. For example, in certain embodiments, the laws and regulations may pertain to whether vehicles may park along roadways, how far along roadways the parking must take place, how long a vehicle may park in a particular location, and so on.

In various embodiments, monitoring is performed at 624 regarding objects in proximity to the vehicle 10 and/or to the respective possible parking locations. Specifically, in various embodiments, the sensor data of 608 is monitored and analyzed with respect to objects that are in proximity to the vehicle 10 and/or the possible parking locations (e.g., objects, or obstacles, 510 of FIG. 5). Also in various embodiments, determinations are made with respect to a measure of proximity (e.g., in terms of distance and/or time) of the objects 510 from the vehicle 10, as well as with respect to movement of the objects, paths of the objects (and possibility overlap with or close proximity to the vehicle 10 and/or a path thereof, and/or to the possible parking locations), and so on. In various embodiments, the monitoring, assessments, and determinations of 624 are performed and/or facilitated by the processor 422 of FIG. 4. In various embodiments, identification is made between different types of objects (e.g., fixed objects, parked motor vehicles, moving motor vehicles, bicycles, pedestrians, and so on).

In various embodiments, traffic flows are also monitored at 625. Specifically, in various embodiments, flows and patterns of traffic movement are monitored with respect to the vehicle 10, the roadway in which the vehicle 10 is travelling, and the possible parking locations. For example, in various embodiments, traffic flows are monitored and analyzed with respect to possible contact with the vehicle 10 (and/or possible close proximity to the vehicle 10, for example that might interfere with an occupant's exit from the vehicle 10) as the vehicle 10 attempts to park at, or is parked in, the possible parking locations. In various embodiments, the traffic flows are monitored by the processor 422 of FIG. 4 using sensor data of 608 (e.g., based on the object monitoring of 624) and/or from data received from outside the vehicle 10 (e.g., traffic reports received at 610, and so on), along with information as to how quickly traffic is moving in a lane with respect to a posted speed limit, and so on.

Ride comfort information is obtained and analyzed at 626. In various embodiments, determinations of ride comfort are made with respect to how easily the vehicle 10 can reach a particular parking spot without sharp or sudden movements or other maneuvers that may be uncomfortable for the driver. Also, in certain embodiments, the ride comfort may also pertain to the ease and comfort with which the occupant may leave the vehicle 10 at the particular location, and/or the ease and comfort with which the occupant may travel (e.g., walk) to the destination 505 from the vehicle 10. In addition, in various embodiments, lateral acceleration, lateral jerk, longitudinal acceleration, and longitudinal jerk are each taken into account in determining the ride comfort.

Scores are calculated at 628 for the possible parking locations. In various embodiments, a respective score is calculated by the processor 422 of FIG. 4 for each of the possible parking locations identified at 618. Also in various embodiments, the scores are calculated using each of the criteria analyzed in 619-626. For example, in certain embodiments: (i) a shorter distance between a particular parking location 502 and the vehicle 10 will lead to a higher (i.e., better) score for the particular parking location 502, all else equal; (ii) a greater lane width in proximity to a particular parking location 502 and the vehicle 10 will lead to a higher score for the particular parking location 502, all else equal; (iii) enhanced compliance with parking laws and regulations at a particular parking location 502 will lead to a higher score for the particular parking location 502, all else equal; (iv) a lack of detected objects posing a threat proximate a particular parking location 502 will lead to a higher score for the particular parking location 502, all else equal; (v) a lack of problematic traffic flow proximate a particular parking location 502 will lead to a higher score for the particular parking location 502, all else equal; and (vi) an enhanced ride comfort measure for parking at particular parking location 502 will lead to a higher score for the particular parking location 502, all else equal.

In addition, in certain embodiments, the score is also influenced by a function that shapes the pullover trajectory for the vehicle 10 based on how much space is available to pull over. Also in certain embodiments, the function compares how far the pullover spot is from the lane boundary edge, and how much longitudinal space there is to perform the maneuver, and intelligently adjusts the pullover or parking maneuver accordingly.

Figure 7:
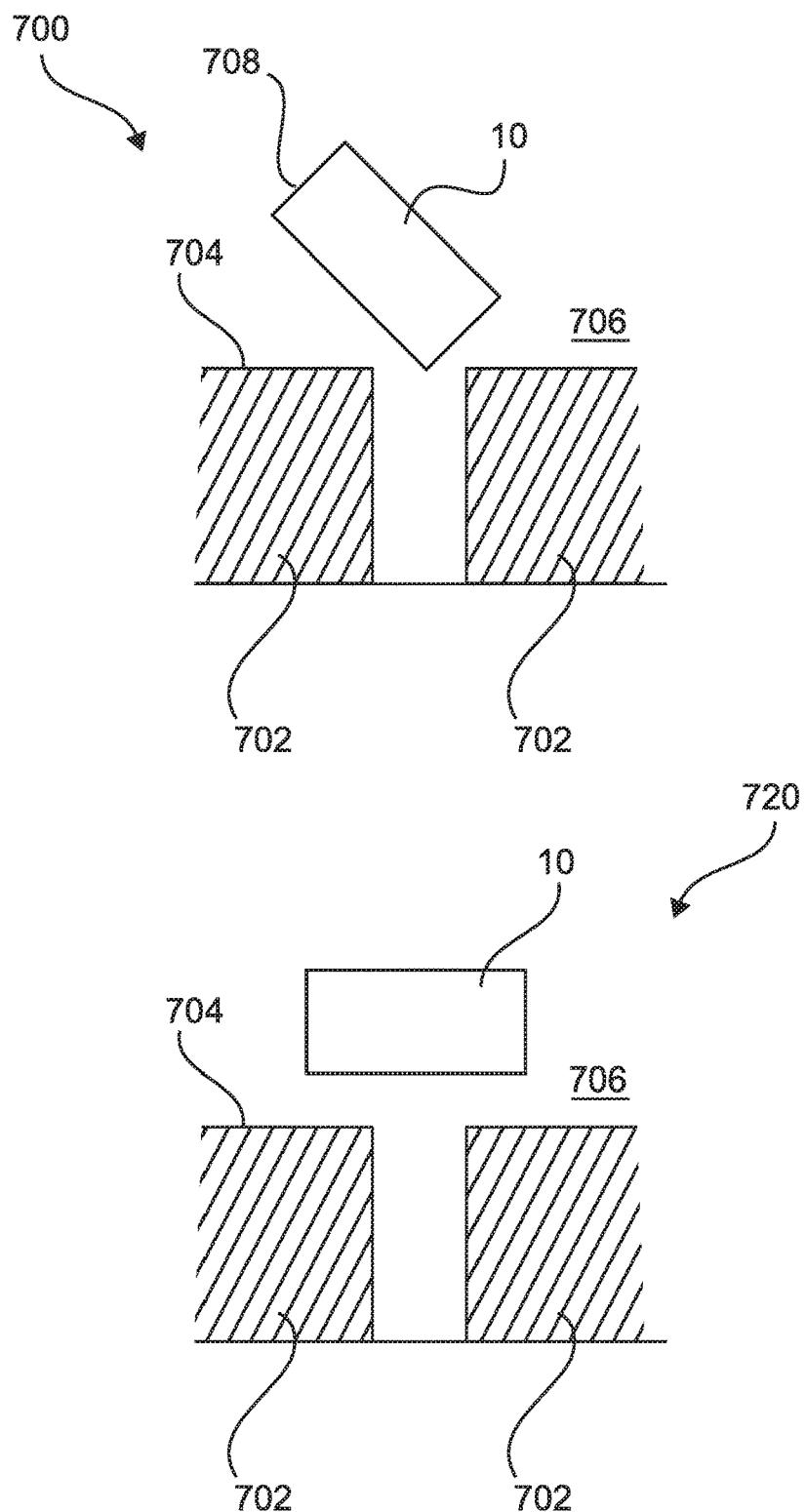
FIG. 7 is a schematic diagram showing views of a vehicle in connection with two respective exemplary parking situations, namely, a first parking situation in which a portion of the vehicle is parked relatively farther from a curb, and a second parking situation in which the portion of the vehicle is parked relatively closer to the curb, in accordance with exemplary embodiments.

In addition, in various embodiments, considerations are made as to minimizing a distance from a curb of a roadway, and/or minimizing an intrusion into the roadway while the vehicle 10 is parked. For example, with reference to FIG. 7, two exemplary parking situations 700, 720 are depicted in accordance with an exemplary embodiment. In both parking situations 700, 720, the vehicle 10 is parked in proximity to moving and/or stationary objects 702 as well as a curb 704 for a roadway 706, as depicted in FIG. 7. However, in first parking situation 700, a portion of the vehicle 10 (particularly, the portion proximate end 708 as depicted in FIG. 7) is relatively farther from the curb 704 as compared with second parking situation 720. Accordingly, as a result, in the first parking situation 700, the vehicle 10 is likely to pose a relatively greater intrusion into the roadway 706 (e.g., with respect to other vehicles or pedestrians that may be using the roadway 706) as compared with the second parking situation 720. Consequently, all else being equal, the second parking situation 720 of FIG. 7 would be provided a higher, or more favorable, score, as compared with the first parking situation 700 of FIG. 1, in accordance with an exemplary embodiment.

Moreover, in certain embodiments, a cost map is generated by assigning values to different types of polygons and by rasterizing the various cost polygons. For example, in various embodiments, polygons pertaining to the shape of the tracked objects, keep-clear zones, intersection lanes, and the like are utilized in the analysis. In addition, in certain embodiments, an exhaustive search in the map database is performed in order to ascertain the optimal parking location (e.g., in order to find the parking location with the highest score for the vehicle 10 to utilize in pulling over and stopping).

A preferred parking location is selected at 630. In various embodiments, the processor 422 of FIG. 4 selects the possible location with the highest (or, best) score, as calculated at 630. In addition, in various embodiments, the score is used to not only select the parking location and/or maneuver, but also to intelligently adjust the maneuver as the vehicle 10 is maneuvered into its parking location.

The preferred parking location is implemented at 632. Specifically, in various embodiments, the processor 422 of FIG. 4 generates instructions that are provided to one or more vehicle systems (e.g., the propulsion system 20, the transmission system 22, the steering system 24, the brake system 26, and/or the actuator systems 30 of FIG. 1) for effectuating the parking of the vehicle 10 in the selected parking location of 630.

In various embodiments, the disclosed methods and systems provide for selection of an optimized parking location for an autonomous vehicle. For example, in various embodiments, the selection of the optimized parking location takes into account factors such as the location of the vehicle, lane width, applicable laws and regulation pertaining to parking, and ride comfort, which are used to calculate respective scores for the potential parking locations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for selecting a parking location for an autonomous vehicle, the method comprising:
   obtaining data pertaining to a current ride of the autonomous vehicle during operation of the autonomous vehicle, wherein the obtaining of the data comprises obtaining data pertaining to respective distances between each of the potential parking locations and the destination;
   determining, by a processor using the data, when the autonomous vehicle is proximate a destination; and
   when the autonomous vehicle is proximate the destination:
      identifying, by the processor using the data, a plurality of potential parking locations proximate the destination;
      calculating, by the processor using the data, a respective score for each of the potential parking locations using a plurality of factors, wherein the calculating comprises calculating the respective score for each of the potential parking locations based at least in part on the respective distances;
      selecting, by the processor using the data, a selected parking location of the potential parking locations based on the respective score of each of the potential parking locations; and
   automatically parking the autonomous vehicle in the selected parking location, via instructions provided by the processor.

2. The method of claim 1, wherein:
   the obtaining of the data further comprises obtaining data pertaining to a width of a lane of a roadway in which the autonomous vehicle is travelling; and
   the calculating further comprises calculating the respective score for each of the potential parking locations based at least in part on the width of the lane.

3. The method of claim 1, wherein:
   the obtaining of the data further comprises obtaining data pertaining to parking laws, regulations, or both, for a geographic region in which the autonomous vehicle is operating; and
   the calculating further comprises calculating the respective score for each of the potential parking locations based at least in part on the parking laws, regulations, or both.

4. The method of claim 1, wherein:
   the obtaining of the data further comprises obtaining data pertaining to detected objects in proximity to the autonomous vehicle; and
   the calculating further comprises calculating the respective score for each of the potential parking locations based at least in part on the detected objects.

5. The method of claim 1, wherein:
   the obtaining of the data further comprises obtaining data pertaining to respective traffic flows in proximity to each of the potential parking locations; and
   the calculating further comprises calculating the respective score for each of the potential parking locations based at least in part on the respective traffic flows.

6. The method of claim 1, wherein:
   the obtaining of the data further comprises obtaining data pertaining to a respective ride comfort measure for each of the potential parking locations; and the calculating further comprises calculating the respective score for each of the potential parking locations based at least in part on the respective ride comfort measures.

7. A system for controlling selection of a parking location for an autonomous vehicle, the system comprising:
a parking selection object module configured to at least facilitate obtaining data pertaining to a current ride of the autonomous vehicle during operation of the autonomous vehicle, wherein the data pertains to a width of a lane of a roadway in which the autonomous vehicle is travelling; and
a parking selection determination module including a processor, and configured to at least facilitate:
determining when the autonomous vehicle is proximate a destination; and
when the autonomous vehicle is proximate the destination:
identifying, using the data, a plurality of potential parking locations proximate the destination;
calculating, using the data, a respective score for each of the potential parking locations using a plurality of factors, including the width of the lane;
selecting, using the data, a selected parking location of the potential parking locations based on the respective score of each of the potential parking locations; and
automatically parking the autonomous vehicle in the selected parking location.

8. The system of claim 7, wherein:
the parking selection object module is further configured to at least facilitate obtaining data pertaining to respective distances between each of the potential parking locations and the destination; and
the parking selection determination module is further configured to at least facilitate calculating the respective score for each of the potential parking locations based at least in part on the respective distances.

9. The system of claim 7, wherein:
the parking selection object module is further configured to at least facilitate obtaining data pertaining to parking laws, regulations, or both, for a geographic region in which the autonomous vehicle is operating; and
the parking selection determination module is further configured to at least facilitate calculating the respective score for each of the potential parking locations based at least in part on the respective parking laws, regulations, or both.

10. The system of claim 7, wherein:
the parking selection object module is further configured to at least facilitate obtaining data pertaining to detected objects in proximity to the autonomous vehicle; and
the parking selection determination module is further configured to at least facilitate calculating the respective score for each of the potential parking locations based at least in part on the detected objects.

11. The system of claim 7, wherein:
the parking selection object module is further configured to at least facilitate obtaining data pertaining to respective traffic flows in proximity to each of the potential parking locations; and
the parking selection determination module is further configured to at least facilitate calculating the respective score for each of the potential parking locations based at least in part on the respective traffic flows.

12. The system of claim 7, wherein:
the parking selection object module is further configured to at least facilitate obtaining data pertaining to a respective ride comfort measure for each of the potential parking locations; and
the parking selection determination module is further configured to at least facilitate calculating the respective score for each of the potential parking locations based at least in part on the respective ride comfort measures.

13. An autonomous vehicle comprising:
one or more sensors configured to at least facilitate obtaining data pertaining to a current ride of the autonomous vehicle during operation of the autonomous vehicle, including data pertaining to parking laws, regulations, or both, for a geographic region in which the autonomous vehicle is operating; and
a processor configured to at least facilitate:
determining when the autonomous vehicle is proximate a destination; and
when the autonomous vehicle is proximate the destination:
identifying, using the data, a plurality of potential parking locations proximate the destination;
calculating, using the data, a respective score for each of the potential parking locations using a plurality of factors, including the parking laws, regulations, or both;
selecting, using the data, a selected parking location of the potential parking locations based on the respective score of each of the potential parking locations; and
providing instructions to at least facilitate automatically parking the autonomous vehicle in the selected parking location.

14. The autonomous vehicle of claim 13, wherein:
the one or more sensors are further configured to at least facilitate obtaining data pertaining to at least one of the following: respective distances between each of the potential parking locations and the destination; a width of a lane of a roadway in which the autonomous vehicle is travelling; detected objects in proximity to the autonomous vehicle; respective traffic flows in proximity to each of the potential parking locations; or a respective ride comfort measure for each of the potential parking locations; and
the processor is further configured to at least facilitate calculating the respective score for each of the potential parking locations based at least in part on at least one of the following: the respective distances; the width of the lane; the detected objects; the respective traffic flows; or the respective ride comfort measures.

15. The autonomous vehicle of claim 13, wherein:
the one or more sensors are further configured to at least facilitate obtaining data pertaining to each of the following: respective distances between each of the potential parking locations and the destination; a width of a lane of a roadway in which the autonomous vehicle is travelling; detected objects in proximity to the autonomous vehicle; respective traffic flows in proximity to each of the potential parking locations; or a respective ride comfort measure for each of the potential parking locations; and
the processor is further configured to at least facilitate calculating the respective score for each of the potential parking locations based at least in part on at each of the following: the respective distances; the width of the lane; the detected objects; the respective traffic flows; or the respective ride comfort measures.

\* \* \* \* \*